C. S. LOCKWOOD.
ROLLER BEARING WITH THRUST CONTROL RING.
APPLICATION FILED APR. 1, 1914.
1,122,518.
Patented Dec. 29, 1914.
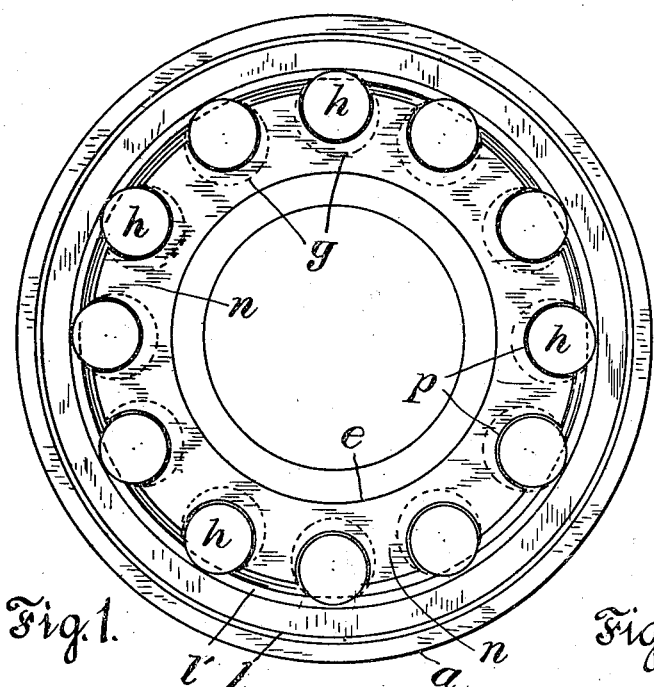
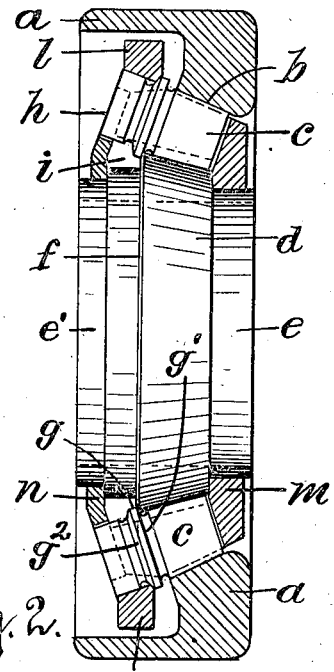
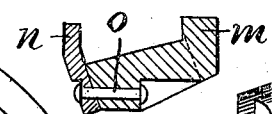
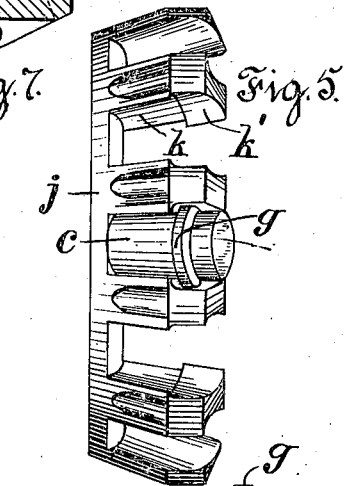
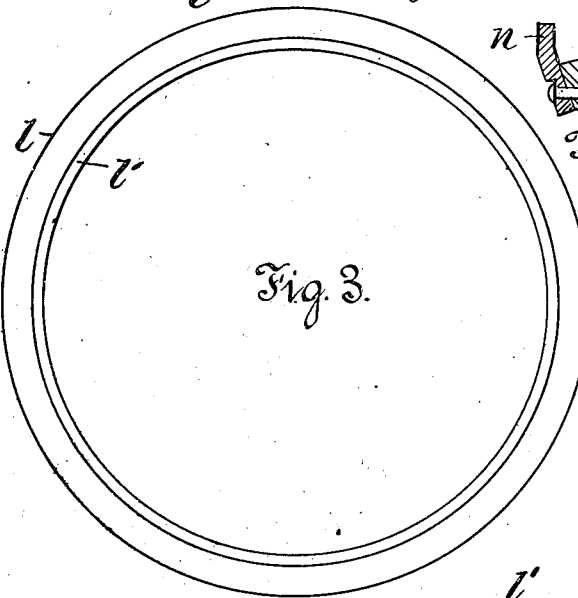
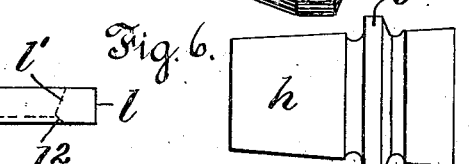

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING WITH THRUST-CONTROL RING.

1,122,518.  Specification of Letters Patent.  Patented Dec. 29, 1914.

Application filed April 1, 1914. Serial No. 828,647.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Roller-Bearings with Thrust-Control Rings, fully described and represented in the following specification and the accompanying drawings, forming a part of the same.

This invention relates to that class of roller bearings which is provided with a conical casing and a conical hub, with a series of tapering rolls fitted between the hub and casing. In such bearings, a lateral load upon the rolls tends to thrust them endwise, as the taper of the rolls produces a tendency to move them toward the larger end of the space in which they rotate. It is therefore customary in such bearings to provide some means for restraining the tendency of the rolls to move endwise, and such restraint is exercised in the present invention by means which avoids any rubbing of the roll against the casing or other stationary parts. Such result is secured by providing the larger end of each roll in the series with a projecting collar and with a shank forming an extension of the roll-body projecting beyond such collar, and forming a freely rotatable ring with an inwardly projecting corner, from which faces are sloped outwardly in opposite directions and fitted respectively to the shanks of the rolls and to the outer side of the collar. Such ring may be termed a "floating ring," as it is not supported by anything except the rolling surfaces with which it contacts.

The hub is shouldered at its larger end to contact with the inner sides of the collars, which act in opposition to inner bevel upon the ring and hold the rolls in contact therewith. The rolls are carried in sockets in a cage which is fitted to roll-seats at opposite ends of the hub, such cage having a keeper-ring attached to one end to hold all the parts in their working positions after they are assembled upon the hub. The "roll-set" and the hub may thus be handled as a unitary structure and all the parts held together when the hub is mounted upon a shaft, before the casing is applied to the rolls.

The invention will be understood by reference to the annexed drawing, in which—

Figure 1 is an elevation of the bearing looking toward the larger end of the rolls; Fig. 2 is an elevation of the hub and rolls with a section of the cage and casing at the center line of the latter; Fig. 3 is an elevation, and Fig. 4 an edge view of the floating-ring for confining the rolls. Fig. 5 is an edge view of the cage-body with one of the rolls in a socket of the cage; Fig. 6 is a side elevation of one of the rolls upon a larger scale than the other figures; and Fig. 7 is a section of one side of the cage intermediate to the roll-sockets.

The casing $a$ is shown with a tapering conical seat $b$ which rests upon the outer sides of the roll-bodies $c$. The hub is formed with a roll-seat $d$ adapted to receive such body, and with cage-seats $e$ and $e'$ at its smaller and larger ends respectively. The hub is shouldered down at the larger end of the roll-seat, forming a shoulder $f$, and each roll is provided with a collar $g$ having an inner face $g'$ which bears upon the shoulder $f$ which is beveled to coincide with the flat face of the collar. The outer side of the collar is formed with a bevel $g$, and a shank $h$ which forms an extension of the roll-body is projected outward from the collar and supports the floating-ring $l$. The ring, as shown in Figs. 3 and 4, is formed with a bevel face $l'$ to fit the sloping surfaces of the shanks $h$, and its inner corner is also formed with a bevel $l^2$ to fit the beveled outer sides $g^2$ of the collars upon the rolls. Such beveling of the collar and the ring is necessary, because the outer corners of the collar, if its face were flat, would gouge and scrape against the sharp corner of the ring if the latter were not beveled; but with the beveled construction shown, the ring rolls freely in contact with the shanks and the outer sides of the collars and evidently prevents any expansion or outward movement of the rolls. The shoulder $f$ upon the hub holds the rolls in the required relation to the ring, by preventing any sliding of the rolls toward the smaller end of the cone, which would retract them from contact with the ring while the contact of the ring-face $l^2$ with the outer sides of the roll-sections prevents any sliding of the rolls toward the larger end of the cone. The ring $l$ by its contact with the outer sides of the roll-shanks $h$ also operates to prevent any movement of the rolls toward the smaller end of the cone, and thus holds the rolls in the proper path without any rubbing friction.

Where the hub is shouldered down, a clearance-space $i$ is formed in which the edges of the collars roll and such space permits the rolls when assembling the parts to be tipped with their axes parallel to the axis of the hub, as such position permits each roll to be slipped within the embrace of the ring, until all the rolls are assembled upon the hub with the ring around them. The application of a cage thereto serves to hold them in their normal inclined position.

The cage is shown in Figs. 2 and 7, of two parts to permit its application to the rolls, Fig. 5 showing an annular conical body $j$ having sockets $k$ to receive the roll-body $c$, and such sockets formed with enlargement $k'$ at the upper end to receive the collars $g$, as shown in one of the rolls represented in position in its socket. The smaller end of the cage is formed with a flange $m$ to fit the cage-seat $e$ upon the hub. A keeper-ring $n$ is fitted to turn upon the cage-seat $e'$, and is shaped to contact with the larger end of the cage-body to which it is secured by screw rivets $o$, as shown in Fig. 7. The keeper-ring has notches $p$ shown in Fig. 1, to embrace but clear the shanks upon the rolls. When the rolls are assembled within the ring $l$, the cage-body can be slipped upon the smaller end of the hub with its sockets receiving each one of the roll-bodies, and the keeper-ring is then secured to the cage-body, which holds the roll-set in permanent connection with the hub. When the casing is slipped over the roll-set, its seat $b$ fits the outer sides of the roll-bodies and is firmly supported against lateral or longitudinal thrust, as any end movement of the rolls is resisted by the floating-ring $l$, which has a rolling contact with the only parts in the bearing that it touches, and thus causes a minimum of friction in resisting the end movement of the rolls. The roll-set and casing are adapted for any of the uses for which such a bearing is applied.

Having thus set forth the nature of the invention what is claimed herein is:

1. In a roller bearing, the combination, with a conical casing, and a conical hub shouldered down upon its larger end, of a series of tapering rolls fitted to the hub and casing and provided each with a collar fitted upon its inner side to such shoulder, the roll having a shank outside of such collar, and a freely rotatable ring fitted to the said shank and to the outer side of such collar, and operating to hold the collar against the shoulder on the hub.

2. In a roller bearing, the combination, with a conical casing and a hub shouldered down at its larger end, of a series of tapering rolls fitted to the hub and casing and provided each with a collar fitted upon its inner side to the shoulder upon the hub, the roll having a shank outside of such collar and the collar beveled toward such shank, and a freely rotatable ring having two beveled faces upon its inner side fitted respectively to the shank and to the beveled face of the collar, and resisting end-movement of the rolls in either direction.

In testimony whereof I have hereunto set my hand in the presence of two subscribing witnesses.

CHARLES S. LOCKWOOD.

Witnesses:
M. E. JAHN,
I. R. HOWARTH.